F. A. NIEBERDING.
WATER HEATER.
APPLICATION FILED FEB. 19, 1910.
980,327.
Patented Jan. 3, 1911.
3 SHEETS—SHEET 1.
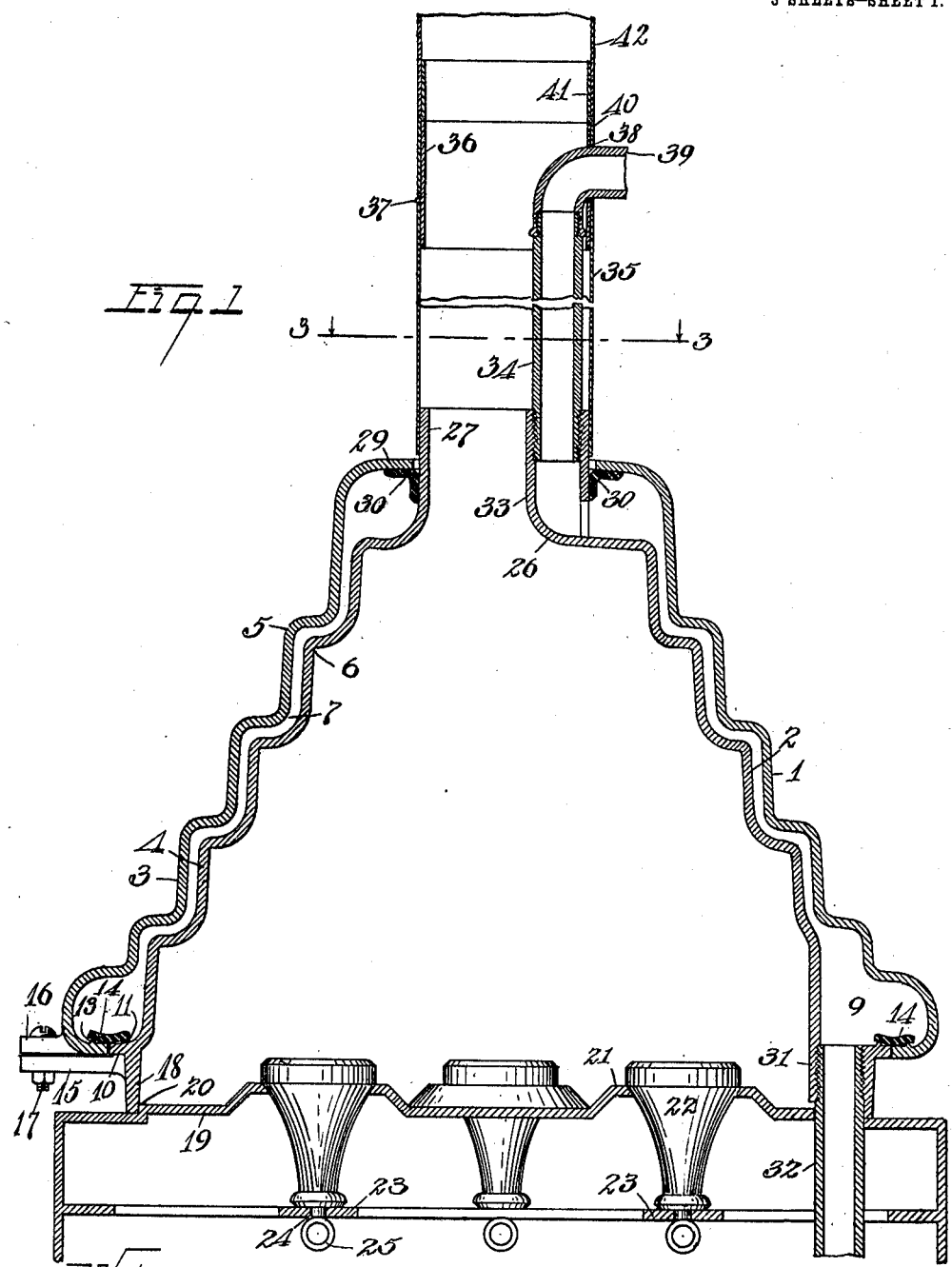

F. A. NIEBERDING.
WATER HEATER.
APPLICATION FILED FEB. 19, 1910.
980,327.
Patented Jan. 3, 1911.
3 SHEETS—SHEET 2.
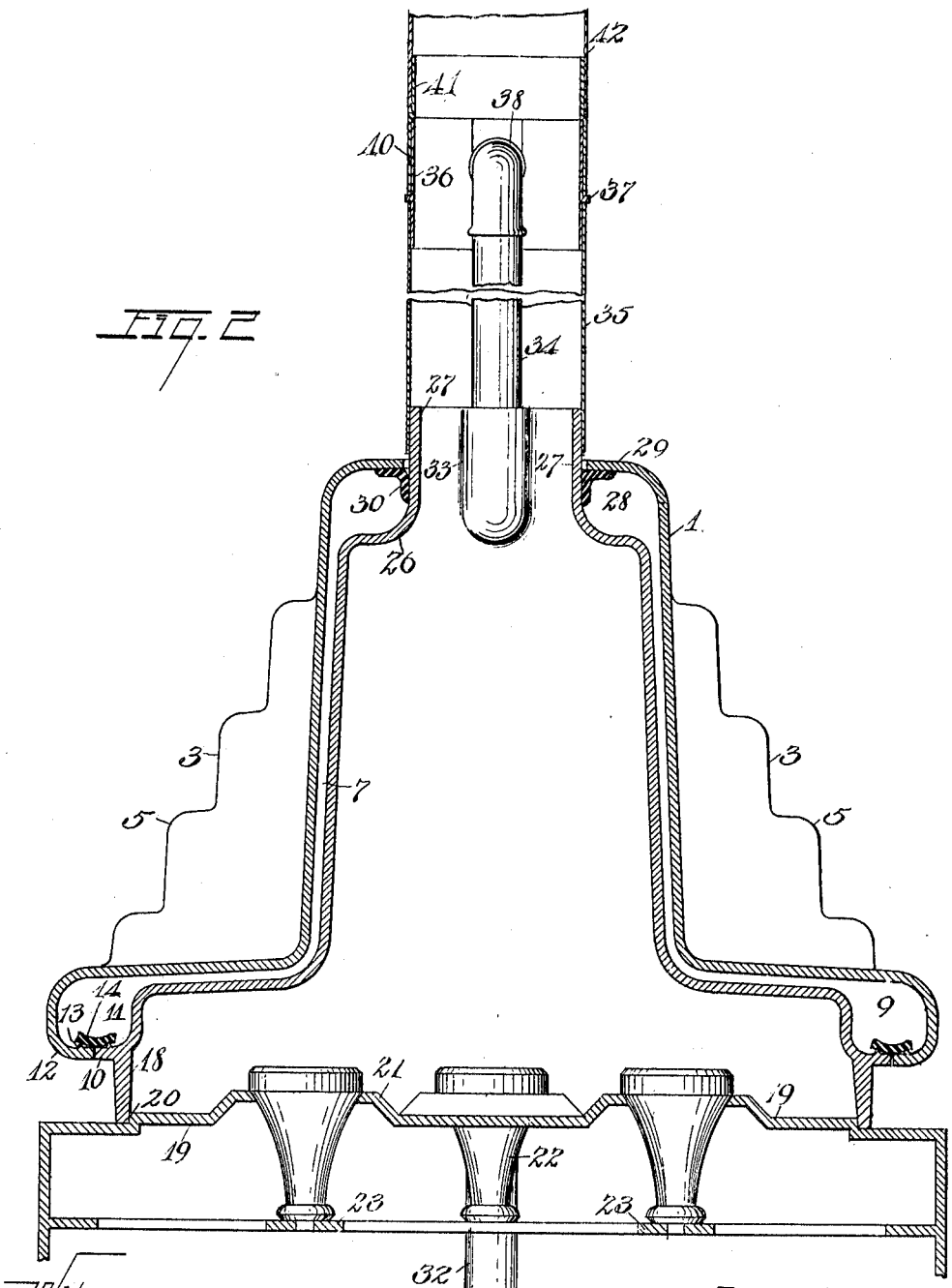

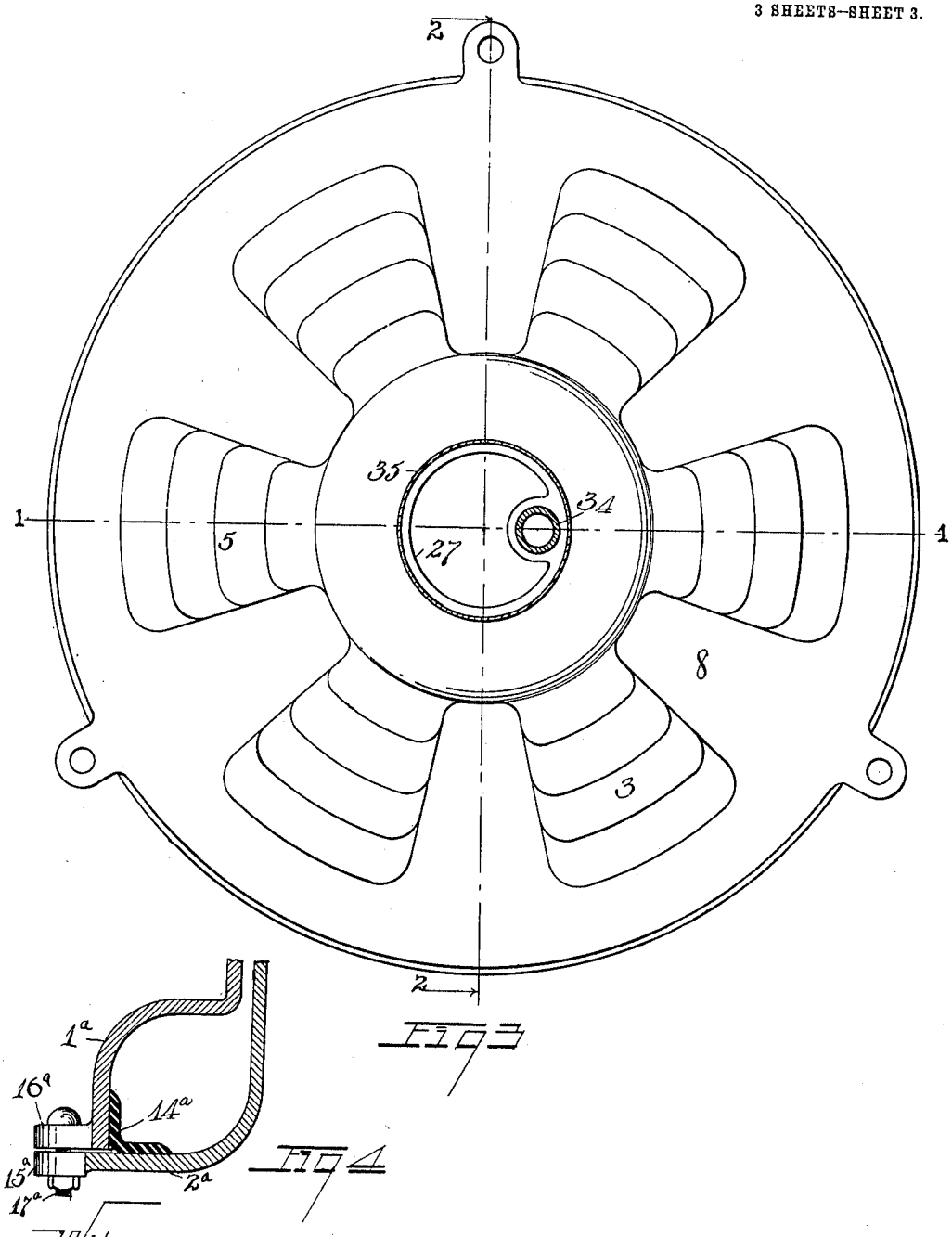

UNITED STATES PATENT OFFICE.

FRANK A. NIEBERDING, OF CLEVELAND, OHIO.

WATER-HEATER.

980,327.

Specification of Letters Patent.

Patented Jan. 3, 1911.

Application filed February 19, 1910. Serial No. 544,791.

*To all whom it may concern:*

Be it known that I, FRANK A. NIEBERDING, a citizen of the United States, residing at Cleveland, in the county of Cuyahoga and State of Ohio, have invented a certain new and useful Improvement in Water-Heaters, of which the following is a full, clear, and exact description, reference being had to the accompanying drawings.

This invention relates to water heaters, and has for its object to provide a heater of this type which shall be extremely efficient in operation, insuring rapid and economical heating of the water supplied therethrough; which shall be comparatively simple and inexpensive of production; which may be readily assembled and disassembled for purposes of repair and cleaning; and which shall be provided with extremely efficient means for the prevention of leakage at the joints thereof.

With the foregoing general objects in view, the invention may be defined further as consisting of the combinations of elements embodied in the claims hereto annexed and illustrated in the drawings forming part thereof, wherein—

Figure 1 represents a vertical sectional view of a water heater constructed in accordance with my invention, said view corresponding to the line 1—1 of Fig. 3; Fig. 2 represents a similar view, taken at right angles to the view shown in Fig. 1 and corresponding to the line 2—2 of Fig. 3; Fig. 3 represents a sectional view corresponding to the line 3—3 of Fig. 1; and Fig. 4, a sectional detail illustrating a modification of the base of the heater shown in the preceding figures.

Describing the parts by reference characters, 1 denotes the outer and 2 the inner shell of the heater proper. These shells are both generally frusto-conical, being larger at the bottom than at the top and, for the purpose of affording the maximum heating surface for the areas of the shells, each comprises a central body having a plurality of segmental wings or projections, said segmental wings being provided with transverse corrugations. 3 denotes the outwardly projecting wings of the outer shell and 4 the corresponding wings of the inner shell; 5, the corrugations of the outer shell and 6 the corrugations of the inner shell, the corrugations being so arranged relatively to each other as to form therewith a restricted water chamber or passageway 7. Between the radial wings or projections 3, substantially vertical spaces 8 are provided, and the inner and outer walls of the shell are spaced apart at these points substantially the same distance as between the projecting portions of the shells, thereby preserving a substantially uniform width of water chamber or passageway 7 extending entirely around the heater and between the inner and outer shells.

At the bottom, the inner and outer shells are flared, as shown in Figs. 1 and 2, to provide a somewhat enlarged annular base chamber 9. The outer edge of the inner shell extends in a substantially horizontal direction, as shown at 10, and is preferably provided, within the outer periphery, with a rib 11 extending completely therearound. The outer shell is provided with a substantially horizontal inwardly projecting lower end 12 adapted to come more or less closely to the corresponding edge of the inner shell and is preferably provided outside of its peripheral edge with an annular rib 13. These ribs are preferably thin or sharp at their upper edges and adapted to receive an annular packing ring or gasket 14, preferably of rubber, which annular ring or gasket rests on the tops of the ribs 11 and 13 and covers the space therebetween.

For the purpose of securing the bottoms of the inner and outer shells together, these shells are provided with outwardly projecting flanges 15 and 16, respectively, which are adapted to be secured together by means of bolts 17. The lower end of the inner shell is provided with a downwardly projecting flange 18 by means of which both shelves may be supported from a base 19, said base being conveniently provided with an upwardly projecting shoulder 20 adapted to fit within and be engaged by said downwardly projecting flange. This base is provided with a suitable number of perforated, upwardly extending projections 21 which receive the upper ends of burners 22. Beneath the top plate 19 of the base there is provided a spider through the solid portions 23 of which project the nipples 24 by means of which gas may be supplied to the burners from the branch pipes 25.

At its upper end, the inner shell 2 is projected inwardly, as shown at 26, and is provided with an upwardly extending neck 27. The upper end of the outer shell 1 extends above the inwardly projecting portion 26 of the inner shell and forms therewith an annular chamber 28. For convenience of assembling the joint between the upper ends of the inner and outer shells is provided between the neck 27 and the inner peripheral edge of the inwardly projecting portion 29 of the outer shell and this joint will be covered and closed by means of a packing ring or gasket, preferably of rubber and bent to angular shape, as shown at 30, and having its branches or flanges resting respectively against the neck of the inner shell and the inwardly projecting portion 29 of the outer shell and covering and closing the joint therebetween.

For the purpose of supplying water to the space between the inner and outer shells, the inner shell is provided at its bottom with a connection 31 which may be internally threaded for the reception of the upper end of the supply pipe 32, said pipe discharging into the lower portion of the annular chamber 9. At its upper end, the inner shell is provided with a connection 33, which is preferably cast within the neck of the shell and extends to the top of the neck and provided with an internal thread for the reception of the lower threaded end of the outlet pipe 34.

35 denotes a flue pipe which may be conveniently fitted on the neck 27. The pipe 35 has applied to the upper end thereof a section 36 adapted to telescope within the said pipe and provided with a flange 37 by means of which is said section supported on top of 35. Above said flange, it is provided with an opening 38 through which extends the elbow 39 of the outlet pipe.

40 denotes a short section which is adapted to telescope over the section 36 and is provided with a neck 41 adapted to receive and support the lower end of another flue section 42. The flue section 40 is provided with an aperture extending upwardly from the lower end thereof and adapted to register with the aperture 38. By this construction, it will be evident that the flue sections 40 and 42 may be conveniently lifted from the short flue section 36 without disturbing the outlet pipe and the elbow.

In Fig. 4 of the drawings there is shown a modification of the base of my heater wherein the lower end of the outer wall 1 extends downwardly, as shown at 1ᵃ, and its edge is adapted to abut more or less closely against the outwardly directed lower edge 2ᵃ of the inner shell. The packing ring or gasket 14ᵃ is bent to angular form, as shown, and is retained in place by the pressure within the heater. The inner and outer shells are provided respectively with flanges 16ᵃ and 15ᵃ by which the shells are secured together, as by bolts 17ᵃ.

The construction described herein is particularly efficient in securing the rapid heating of water, as the water flows through a narrow space provided between two corrugated walls, the inner wall being of such shape as to secure a maximum heating efficiency for this narrow water channel. Furthermore, the shape of the inner and outer walls or shells and the manner of forming the inlet and outlet ends enables the outer shell to be lifted and, if necessary, removed entirely from the inner shell for purposes of cleaning, inspection, repair and assembling. The arrangement and construction of the packing rings 14 and 30 are such as to permit of this action with practically no hindrance. If desired, the upper flue sections can be lifted off the lower section and the outer shell be lifted above the section 35 and removed along the outlet pipe 34 and the elbow 39.

The construction of packing rings and their arrangement with respect to the cooperating parts provide for an economical but effective manner of assembling the heater while securing efficient means for preventing leakage, the rings being forced and held to their seats simply by the pressure of the water within the heater. The ring or gasket 14 forms a tight joint with the upper edges of the ribs 11 and 13. The ring 14 may be pressed against the joint or space between the edges of the inner and outer shells and thus prevent with even more certainty the leakage of water at this point. Whether the water pressure will cause the ring to contact with this space will depend upon the height of the ribs, the distance between them, the flexibility of the ring, and the pressure of the water.

In assembling, the ring 30 will be applied to the neck 27 and will be retained thereon by friction. The ring 14 will be applied to the edge of the inwardly directed flange 12 of the outer shell. The outer shell will then be applied to the inner shell. The inwardly projecting end or flange 29 of the outer shell will engage the upper portion of the ring 30 and deflect it in the manner shown in the drawing, while the inwardly projecting portion of the ring 14 will engage the outwardly projecting flange or portion 10 at the bottom of the inner shell.

Having thus described my invention, what I claim is:

1. A water heater comprising an inner and an outer shell having a chamber therebetween, said heater being provided with wings or projections with recesses therebetween, said wings or projections being corrugated, and means for heating the interior of the inner shell.

2. A water heater comprising an inner and an outer shell forming a water passageway therebetween, said shells being projected outwardly to form segmental wings and being of generally frusto-conical shape, said wings being provided with transverse corrugations.

3. In a water heater, the combination of an inner and an outer shell having a chamber formed therebetween, the heater being of generally tapering contour from bottom to top and provided with segmental projections tapering from the bottom toward the top, said projections being corrugated, and means for applying heat to the interior of the inner shell.

4. In a water heater, the combination of an inner and an outer shell having a narrow passageway formed therebetween, the heater being of generally tapering contour from bottom to top and provided with projections, said projections being transversely corrugated on the interior thereof, and means for applying heat to the interior of the inner shell.

5. In a water heater, the combination of an inner shell of generally frusto-conical shape, an outer shell of similar shape forming a water passageway with the inner shell, and packing rings loosely covering the joints between the inner and outer shells at the top and bottom thereof.

6. In a water heater, the combination of an inner shell, an outer shell forming a passageway with the inner shell, and a packing ring or gasket loosely covering the joint between the inner and outer shells.

7. In a water heater, the combination of an inner shell having a rib within one edge thereof, an outer shell having an edge adapted to substantially abut against the edge of the inner ring and having a rib within such edge, and a flexible packing ring resting on said ribs and covering the space between said edges.

8. In a water heater, the combination of an inner and an outer shell arranged to form a water chamber and having their edges in proximity, and a loose packing ring or gasket in said chamber covering the space or joint between said edges.

9. In a water heater, the combination of an inner and an outer shell arranged to form a water-heating chamber therebetween, one of said shells being removable from the other shell and there being a space formed between one of said shells and a coöperating portion of the other shell, and a packing ring loosely covering the space thus formed between said shells.

10. In a water heater, the combination of an inner and an outer shell, means detachably connecting said shells, the outer shell having its upper end directed inwardly and the inner shell having a neck projecting through such inwardly-directed portion of the outer shell, and a packing ring loosely covering the joint formed between such neck and the inwardly projecting portion of the outer shell.

11. In a water heater, the combination of an inner and an outer shell, means detachably connecting said shells, the outer shell having its upper end directed inwardly and the inner shell having a neck projecting through such inwardly-directed portion of the outer shell, and an angular packing ring covering the space formed between such neck and the inwardly-projecting portion of the outer shell.

12. In a water heater, the combination of an inner and an outer shell, one of said shells having an edge in proximity to an edge of the outer shell and at an angle thereto, and an angular packing ring or gasket loosely covering the space between said edges.

13. In a water heater, the combination of tapered inner and outer shells arranged to provide a water passage-way therebetween and having their edges in proximity, and a packing ring or gasket loosely covering the joint or space formed between such edges.

14. In a water heater, the combination of tapered inner and outer shells arranged to form a water passage-way therebetween and having their edges in proximity, one of said shells being provided with an inlet and an outlet connection, and a flexible packing ring or gasket loosely covering the joint or space formed between such shells.

In testimony whereof, I hereunto affix my signature in the presence of two witnesses.

FRANK A. NIEBERDING.

Witnesses:
  J. B. HULL,
  BRENNAN B. WEST.